United States Patent [19]

Anhalt et al.

[11] 4,200,768
[45] Apr. 29, 1980

[54] CABLE ASSEMBLY AND METHOD OF MAKING THE SAME

[75] Inventors: John W. Anhalt, Orange; David S. Goodman, Mission Viejo; Gerald J. Selvin, Huntington Beach, all of Calif.

[73] Assignee: International Telephone and Telegraph Corporation, New York, N.Y.

[21] Appl. No.: 947,563

[22] Filed: Oct. 2, 1978

[51] Int. Cl.² .......................................... H02G 15/22
[52] U.S. Cl. ...................................... 174/79; 174/76; 403/267
[58] Field of Search ............................ 174/79, 76, 10; 254/134.3 FT; 403/265, 266, 267, 268, 300, 306, 314

[56] References Cited

U.S. PATENT DOCUMENTS

| 3,989,400 | 11/1976 | Smith | 174/79 |
| 4,002,817 | 1/1977 | DeGrado | 174/79 X |

FOREIGN PATENT DOCUMENTS 2126956  11/1972  Fed. Rep. of Germany ............ 174/79

Primary Examiner—Roy N. Envall, Jr.
Attorney, Agent, or Firm—A. Donald Stolzy

[57] ABSTRACT

A cable assembly and construction method to enable a cable to be pulled lengthwise in a conduit or otherwise, wherein a perforate plate is placed among insulated wires in a bundle emanating from one end of the cable jacket or sheath. The wires are bonded to each other and to the plate by potting. An epoxy or resin may be used, if desired. Alternatively a paraffin potting step may be employed to provide a base for a resin, a paraffin block being potted between the jacket and the resin.

7 Claims, 4 Drawing Figures

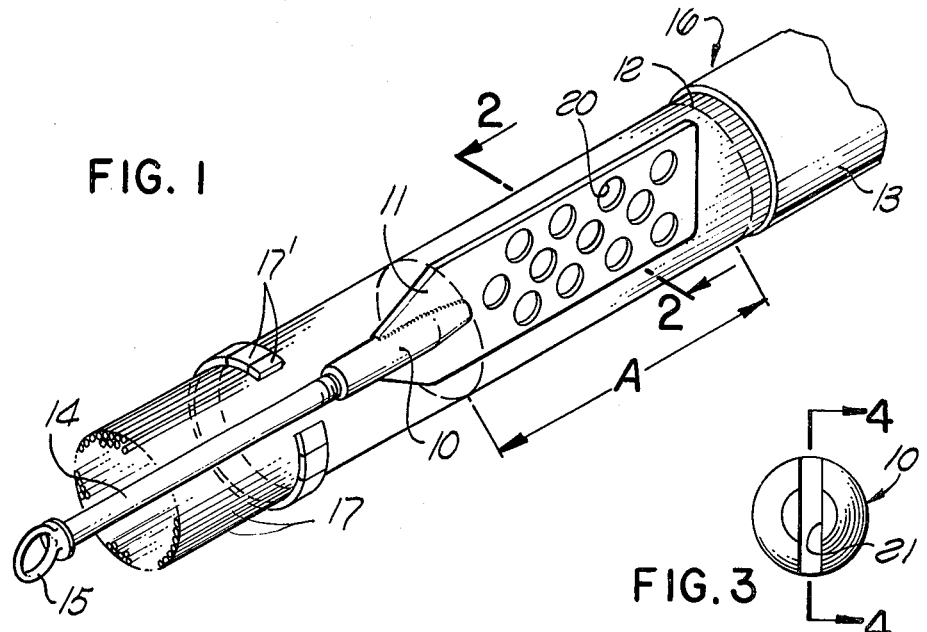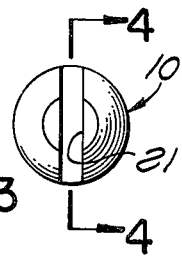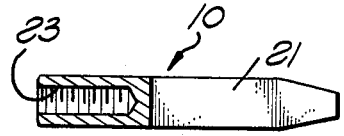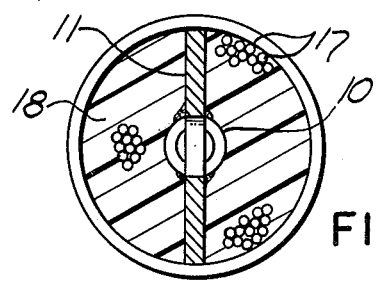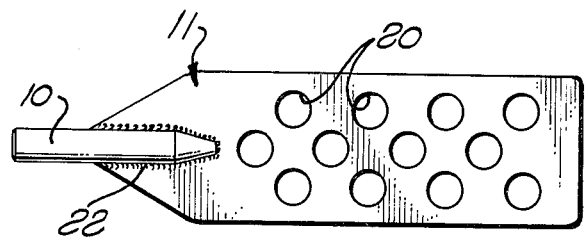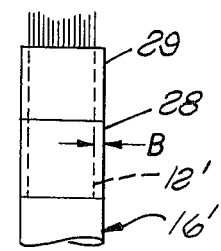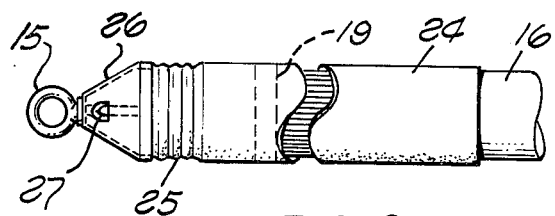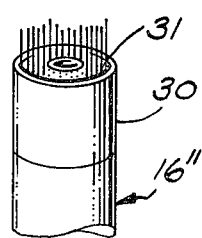

4,200,768

CABLE ASSEMBLY AND METHOD OF MAKING THE SAME

BACKGROUND OF THE INVENTION

This invention relates to cable constructions and more particularly to apparatus providing a mechanical connection to a telephone cable or the like, and a method of making the apparatus.

PRIOR ART STATEMENT

It has been a current trend of telephone companies to reduce overall costs and improve reliability of telephone cable installations. Cable installation is one major cost. In present underground installations or other types of cable installations cable ends are capped, sealed and provided with pulling eyes for pulling the cable through underground conduit. Once pulled through the conduit, the cables must then be spliced to an adjacent cable in the case of a branch or feed thru line or otherwise.

The capped ends of the cable must be removed, the wire leads separated, then terminated wire by wire to an adjacent cable. This operation is extremely time consuming and in most cases is done in underground (manhole) chambers in adverse working conditions.

Some telephone companies are terminating one end of a cable at the factory, however, this system still requires wire cutting and terminating of the cable end without electrical connectors. Unfortunately, no pulling equipment has yet been devised in the prior art where adjacent ends of two cables can be provided with electrical connectors for easy and inexpensive underground mating.

SUMMARY OF THE INVENTION

In accordance with the assembly of the present invention, the above-described and other disadvantages of the prior art are overcome by bonding a body to the wires or the like of a cable, and attaching pulling means to the body. In this case, a potting compound-like material may be used for bonding.

The wires may then be attached to conventional or other electrical connectors.

If desired, an airtight rubber or other boot may be employed to cover the end of the cable when it is pulled.

BRIEF DESCRIPTION OF THE DRAWINGS

In the accompanying drawings which illustrate exemplary embodiments of the present invention:

FIG. 1 is a perspective view of a cable assembly constructed in accordance with the present invention;

FIG. 2 is a transverse sectional view of the assembly taken on the line 2—2 shown in FIG. 1;

FIG. 3 is a side elevational view of a portion of the cable assembly shown in FIG. 1;

FIG. 4 is a vertical sectional view of a portion of an assembly shown in FIG. 2 and taken on the line 4—4 shown in FIG. 3;

FIG. 5 is a side elevational view of the part shown in FIG. 3;

FIG. 6 is a broken side elevational view of a cable termination constructed in accordance with the present invention;

FIG. 7 is a side elevational view of a cable termination constructed in accordance with one embodiment of the present invention; and FIG. 8 is an orthogonal view of a cable termination constructed in accordance with the present invention.

DESCRIPTION OF THE PREFERRED EMBODIMENTS

In FIG. 1 a cable is provided at 16 including a bundle of wires 12 projecting from a jacket 13. A part 10 is shown fixed to a plate 11 amid the bundle 12 of wires. A rod 14 is threaded to part 10. A part 15 is fixed to or threaded to rod 14. A connection may be made from part 15 to a snake-like cable or otherwise for pulling cable 16.

As shown in FIG. 2, a Koppers polyester resin 6060-5 has been potted in the interstices between wires 17 over a length A (FIG. 1) and surrounding part 10 and plate 11. Part 10, plate 11 and wires 17 over the length A are thus bonded together and maintained in fixed positions relative to each other. The reason is indicated at 18 in FIG. 2. The portions of the wires 17 to the left of the length A may be connected to electrical connectors 17' or otherwise.

In FIG. 1, part 10 and plate 11 are shown, plate 11 having circular holes 20 therethrough which the resin, when in more or less liquid form, can pass. Thus, when the resin is hardened in the holes 20, plate 11 is locked in place in the hardened resin. As shown in FIGS. 3 and 4, part 10 has a slot 21 into which plate 11 is slidable. Part 10 and plate 11 are then welded to each other as indicated by dotted lines 22 shown in FIG. 5.

Part 10, as shown in FIG. 2, has internal threads 23 which engage threads on the right end of rod 14, as viewed in FIG. 1.

Once the cable assembly of FIG. 6 is constructed, shrink tubing 24 may be provided to cover electrical connectors at 19 and the open end of cable 16 and all of the structures extending therefrom to part 15. Tubing 24 has a bellows-like connection 25 to a cone-shaped body 26 that is fixed relative to part 15. A check valve may be provided, if desired, at 27. The tubing 24 may thus be airtight, if desired. A conventional check valve 27 only permits air to exit from inside tubing 24.

In one embodiment of the method of the present invention, a cable 16' as shown in FIG. 7, may be substantially identical to cable 16 and have a wire bundle 12' substantially identical to wire bundle 12 (each wire being provided with insulation from another).

If desired, a hollow thin-walled paper tube or other tube may be slipped over bundle 12' at 28. Tube 28 may have a thickness B or less. The interstices between wires in bundle 12' and inside tube 28 may then be filled with paraffin. The foregoing steps are performed and the paraffin allowed to solidify to a block before a tube 29, similar to tube 28, is placed over bundle 12'. After tube 29 is located in the position shown in FIG. 7, or before, a plate, not shown, may be inserted into the middle of the bundle 12' inside tube 29. The plate may be, if desired, identical to plate 11 with part 10 attached. The said resin is then poured into the interstices between the wires of bundle 12' and fills the space from the top of tube 28 in between wires and inside tube 29 to a position at the top of or near the top of tube 29 thereabove.

In FIG. 8, a cable 16" is shown which may be identical to or similar to either one of the cables 16 or 16'. The method of manufacture of the structure inside a tube 30 above cable 16" may be identical to that inside tube 28 in FIG. 7; however, in FIG. 8, the tube 30 is filled with the said resin 31, and the paraffin is omitted.

What is claimed is:

1. A cable assembly comprising: a cable having a jacket including an open end, said cable having a plurality of filaments arranged lengthwise in said jacket, said filaments having coextensive lengthwise portions projecting beyond the said open end of said jacket; a body positioned in the midst of said filaments; and a hardened resin-like material located in the spaces between said filament portions and said body, and bonded to said filament portions and bonded to said body to hold said body and said filament portions in fixed positions relative to each other.

2. The invention defined in claim 1, wherein said body includes means for connection with a tension element to pull said cable axially.

3. The invention defined in claim 2, wherein said filament portions are positioned in an approximately cylindrical bundle having an axis, said body including a substantially rectangular plate having a thickness and positioned lengthwise in said filament portions approximately one diameter therethrough, said plate having a plurality of apertures extending completely through the said thickness thereof, said filaments including wire leads insulated from each other.

4. The invention defined in claim 1, wherein a boot covers all portions of said filaments, said filaments being electrical conductors and quick detachable electrical connectors connected to said conductors.

5. The invention defined in claim 4, wherein said body includes means for connection with a tension element to pull said cable axially.

6. The invention defined in claim 5, wherein said filament portions are positioned in an approximately cylindrical bundle having an axis, said body including a substantially rectangular plate having a thickness and positioned lengthwise in said filament portions approximately one diameter therethrough, said plate having a plurality of apertures extending completely through the said thickness thereof, said filaments including wire leads insulated from each other.

7. The invention as defined in claim 1, wherein said resin-like material includes a potting compound.

* * * * *